United States Patent Office 3,131,181
Patented Apr. 28, 1964

3,131,181
METHOD OF PREPARING 6-HYDROXY PREGNENES AND PREGNADIENES AND PRODUCTS RESULTING THEREFROM
John P. Dusza, Nanuet, and Seymour Bernstein, New City, N.Y., assignors to American Cyanamid Company, New York, N.Y., a corporation of Maine
No Drawing. Filed May 29, 1961, Ser. No. 113,062
9 Claims. (Cl. 260—239.55)

This invention relates to a new method of preparing 6-hydroxy steroids. More particularly, it relates to a new chemical process for the preparation of 6-hydroxy steroids of the pregnane series.

The novel process of the present invention is used for preparing compounds and can be illustrated as follows:

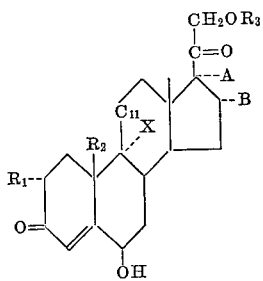

wherein $R_1$ is selected from the group consisting of hydrogen and lower alkyl radicals, $R_2$ is selected from the group consisting of hydrogen and methyl radicals, $R_3$ is selected from the group consisting of hydrogen and lower alkanoyl radicals, A and B are selected from the group consisting of hydrogen, lower alkanoyloxy and hydroxyl radicals, one and only one of which is a hydroxyl radical and when taken together form an alkylidenedioxy radical, $C_{11}$ is selected from the group consisting of

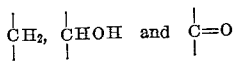

radicals and X is selected from the group consisting of hydrogen and halogen radicals which comprises reacting an enol ether of the formula:

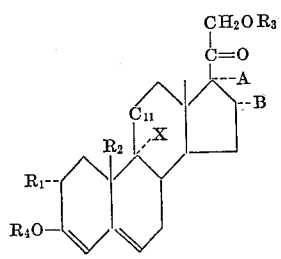

wherein $R_1$, $R_2$, $R_3$, A, B, $C_{11}$ and X are as defined above and $R_4$ is selected from the group consisting of lower alkyl radicals, with a peracid selected from the group consisting of monoperphthalic, perbenzoic acid and performic acid.

The reaction of this invention is generally carried out in a solvent which can be, for example, ether, methylene chloride, chloroform and the like. In the process, the excess of peracid is added to the reaction mixture preferably dissolved in a solvent and the solution usually is left at room temperature for a period of from an hour to 30 hours. The reaction can be carried out at a temperature within the range of from about 15° to 50° C. The desired 6-hydroxylated product frequently crystallizes or precipitates from solution and may be collected by filtration. The product which does not crystallize or precipitate can be separated in crystalline form from the reaction mixture by methods well-known in the steroid art.

The process for preparing and the compounds resulting from the new process of the present invention can be illustrated by the following flowsheet.

FLOWSHEET

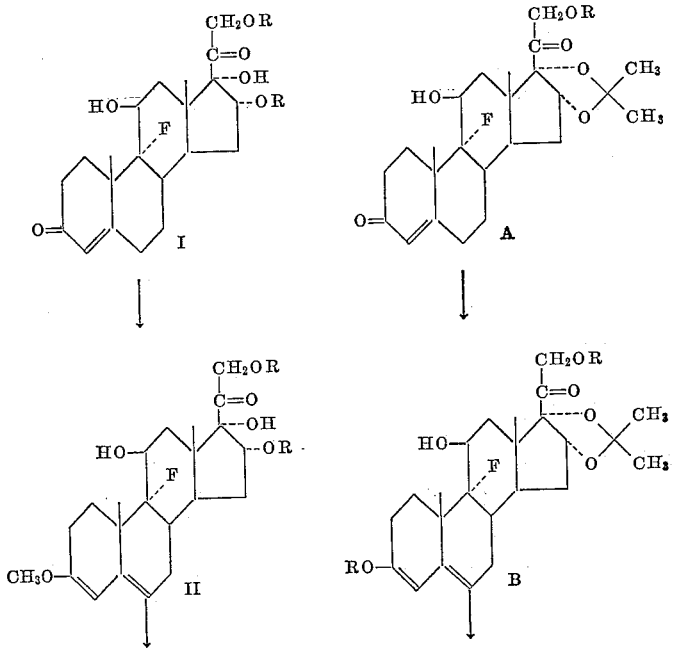

FLOWSHEET—Continued

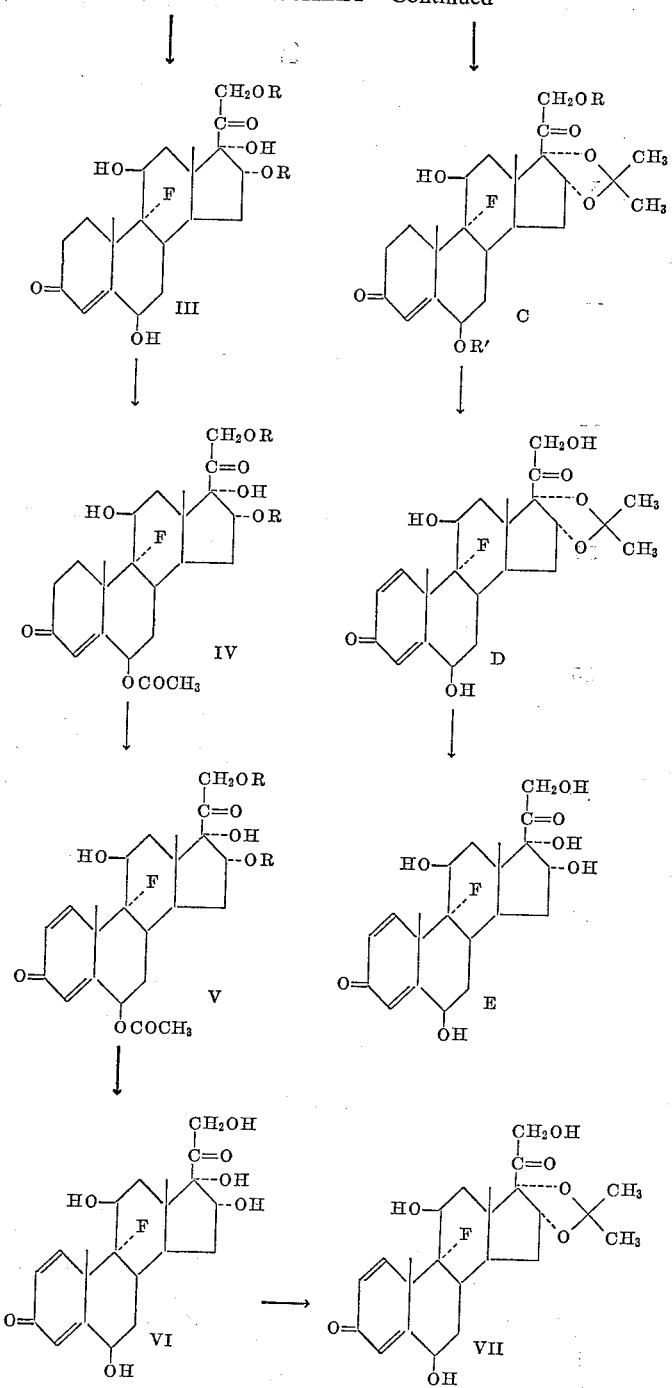

in which R is a lower alkanoyl radical.

The starting material for use in the process of the present invention can be, for example, 16α,21-diacetoxy-9α-fluoro-11β,17α-dihydroxy-3 - methoxy-3,5-pregnadien-20-one; 16α,21-diacetoxy-9α-fluoro-11β,17α-dihydroxy-2α-methyl-3-methoxy-3,5 - pregnadien-20-one; 16α,21-diacetoxy-9α-fluoro-11β,17α-dihydroxy-3 - methoxy-19-nor-3,5-pregnadien-20-one; 9α-fluoro - 11β,17α,21 - trihydroxy-3-methoxy-3,5-pregnadien-20-one; 9α-fluoro-11β,16α,21-trihydroxy-3-methoxy-3,5-pregnadien-20-one; 16α,21-diacetoxy-9α - fluoro-17α-hydroxy-3-methoxy - 3,5-pregnadien-11,20-dione; 16α,21-diacetoxy - 17α-hydroxy-3 - methoxy-3,5-pregnadien-20-one and the like.

The corresponding products resulting from the starting materials above using the process of the present invention are as follows: 16α,21-diacetoxy-9α-fluoro-6β,11β,17α-trihydroxy-4-pregnene-3,20-dione; 16α,21-diacetoxy- 9α-fluoro-6β,11β,17α-trihydroxy-2α-methyl - 4 - pregnene-3,20-dione; 16α,21-diacetoxy-9α-fluoro-6β,11β,17α-trihydroxy-19 - nor - 4 - pregnene-3,20-dione; 9α-fluoro-6β,11β,17α,21-tetrahydroxy-4-pregnene-3,20-dione; 9α-fluoro-6β,11β,16α,21 - tetrahydroxy-4-pregnene-3,20-dione; 16α,21-diacetoxy-9α-fluoro-6β,17α-dihydroxy-4-pregnene-3,11,20-trione; 16α,21-diacetoxy-6β,17α-dihydroxy-4-pregnene-3,20-dione and the like.

The products resulting from the process of the present invention are active glucocorticoids and are, therefore, useful as anti-arthritic agents and in the treatment of burns, bursitis and the like. The 16α,17α-acetonide derivatives are particularly useful for topical application in various skin disorders. The compounds resulting from the present process can also be readily transformed into other steroids which are active glucocorticoids.

The following examples illustrate in detail the process of the present invention and are intended to be by way of illustration and not limitation.

EXAMPLE 1

*16α,21-Diacetoxy-9α-Fluoro-6β,11β,17α-Trihydroxy-4-Pregnene-3,20-Dione*

A solution of 2.0 g. of 16α,21-diacetoxy-9α-fluoro-11β17α-dihydroxy-4-pregnene-3,20-dione (I) in 20 ml. of methylene chloride, 10 ml. of dioxane (dried by storage over alumina), 2.0 ml. of trimethylorthoformate and 0.1 ml. of absolute methanol is cooled to 0–5° C. and stirred briskly. Four drops of concentrated sulfuric acid are added. The reaction is terminated in seven minutes by the addition of 1.0 ml. of pyridine. The entire reaction mixture is reduced in volume at aspirator pressure and subsequently poured into water and extracted with ether. The extract is washed thoroughly with a saturated saline solution and dried with sodium sulfate.

The solution is evaporated and taken up in methylene chloride. Chromatography on activated magnesium silicate (75 g.) gives the desired enol ether eluted primarily in the methylene chloride-1% acetone and -2% acetone aliquots (4×100 ml.) and totaled 0.90 g. Recrystallization of a portion of this material from absolute ether-petroleum ether gives long needles of the enol ether, melting point 202–206° C. (melting point 197–198° C. after drying under reduced pressure); $[\alpha]_D^{25}$ −62° (1% pyridine in chloroform);

$$\lambda_{max.}^{MeOH}\ 238\ m\mu\ (\epsilon\ 22,100)$$

A vigorously stirred solution of 16α,21-diacetoxy-9α-fluoro-11β,17α-dihydroxy-4-pregnene-3,20-dione (10.0 g.) in 100 ml. of methylene chloride, 50 ml. of dioxane, 10 ml. of trimethylorthoformate and 0.5 ml. of absolute methanol is cooled to 0–5° C. and five drops of concentrated sulfuric acid are added. Stirring is continued for 5 minutes and then 1.5 ml. of pyridine is added to the reaction mixture. Most of the methylene chloride is then removed at reduced pressure and then the reaction mixture is poured into water. An ether extract of the solution is thoroughly washed with a saturated saline solution and then dried over sodium sulfate. After removal of the drying agent, the ether volume is adjusted to 125 ml. and 40 ml. of a monoperphthalic acid in ether solution (0.055 g./ml.) is added. Precipitation of the crystalline product begins in a short time and after standing overnight at room temperature, filtration gives 4.50 g. of product. Recrystallization from ethyl acetate gives 1.36 g., melting point 274–276° C.; $[\alpha]_D^{30}$ +66° (pyridine);

$$\lambda_{max.}^{MeOH}\ 232\ m\mu\ (\epsilon\ 16,400)$$

On standing the mother liquor deposits an additional 0.33 g. of product; melting point 266–268° C.

16α,21 - diacetoxy-9α-fluoro-11β,17α-dihydroxy-3-methoxy-3,5-pregnadien-20-one (0.25 g.) is dissolved in 15 ml. of ether (USP) and to this solution is added 3.0 ml. of a monoperphthalic acid in ether solution (0.064 g./ml.). Within 10 minutes the crystallization of the product is noted.

After standing overnight the ether is removed and the solid washed repeatedly with small portions of ether and then petroleum ether to give 0.092 g. of the product. Crystallization from acetone-petroleum ether gives fine prisms of 16α,21-diacetoxy - 9α - fluoro-6β,11β-17α-trihydroxy-4-pregnene-3,20-dione; melting point 272–273° C.

EXAMPLE 2

*9α-Fluoro-6β,11β,16α,17α,21-Pentahydroxy-4-Pregnene-3,20-Dione*

Three hundred milligrams of 16,21-diacetoxy-9α-fluoro-6β,11β,17α - trihydroxy-4-pregnene-3,20-dione (prepared in Example 1) is added to 50 ml. of a saturated solution of ammonia in absolute methanol and is kept at 0–5° C. for 2 hours. Evaporation of the solution gives the desired compound, melting point 268–271° C.

EXAMPLE 3

*9α-Fluoro-6β,11β,16α,17α,21-Pentahydroxy-1,4-Pregnadiene 3,20-Dione*

A solution of 2.70 g. of 16α,21-diacetoxy-9α-fluoro-6β,11β,17α-trihydroxy-4-pregnene-3,20-dione in 15 ml. of acetic anhydride and 15 ml. of dry pyridine is allowed to stand overnight at room temperature. The reaction mixture is then poured into water and thoroughly extracted with ether. The extract is washed with a cold 1% aqueous hydrochloric acid soluiton and then with a saturated saline solution. After drying the ether is evaporated to give an oily residue (2.75 g.). This material is dissolved in 45 ml. of dry dioxane and 7.74 g. of 2,3-dichloro-5,6-dicyanobenzoquinone is added. The reaction mixture on heating becomes homogeneous and is refluxed for 20 hours. On cooling the precipitated hydroquinone is filtered and the filtrate evaporated to dryness under reduced pressure. The residue is dissolved in ethyl acetate and washed in turn with water, cold 1% aqueous sodium hydroxide and saturated saline solution. After drying the solvents are removed to give 1.1 g. of the crude diene-triacetate 6β,16α,21 - triacetoxy - 9α-fluoro-11β,17α-dihydroxy-1,4-pregnadiene-3,20-dione. A solution of this material in 40 ml. of methanol is agitated by a stream of nitrogen. Ten milliliters of a solution of 10% aqueous potassium carbonate is added and the nitrogen stream continued for 45 minutes. The reaction mixture is then neutralized with acetic acid and poured into water. The aqueous solution is extracted with ethyl acetate (10×50 ml.). The ethyl acetate solution is washed with saturated saline solution and dried. Evaporation of the solvent produces a residue which is crystallized from acetone-petroleum ether and gives 0.22 g., melting point 247–250° C. After two more crystallizations from the same solvent pair there is obtained 0.127 g. of needles; melting point 266–268° C.; $[\alpha]_D^{25}$ +5.4° (pyridine)

$$\lambda_{max.}^{MeOH}\ 240\ m\mu\ (\epsilon\ 16,000)$$

EXAMPLE 4

*21-Acetoxy-9α-Fluoro-6β,11β-Dihydroxy-16α,17α-Isopropylidenedioxy-4-Pregnene-3,20-Dione*

21-acetoxy - 9α - fluoro-11β-hydroxy-16α,17α-isopropylidenedioxy-4-pregnene-3,20-dione (1.2 g.) is suspended in a solution of 7.5 ml. of dioxane, 1.0 ml. of triethyl orthoformate and 0.1 ml. of absolute ethanol. A solution of 0.035 ml. of concentrated sulfuric acid in 0.7 ml. of dioxane is added and solution occurred in five minutes. The reaction time is extended for another fifteen minutes. Pyridine is added dropwise until no more color is discharged by the addition of another drop of pyridine. The oily precipitate resulting from the addition of water to the reaction mixture slowly crystallizes and is filtered to give 1.31 g. of desired enol ether, melting point 195–205° C. The crystallization from methanol raises the melting point to 212–214° C.;

$$\lambda_{max.}^{MeOH}\ 240\ m\mu\ (\epsilon\ 19,800)$$

$[\alpha]_D^{25}$ −2.9° (1% pyridine in chloroform).

A suspension of 2.0 g. of 21-acetoxy-9α-fluoro-11β-hydroxy-16α,17α-isopropylidenedioxy - 4 - pregnene-3,20-dione in 15 ml. of dioxane, 1.5 ml. of trimethyl orthoformate and 0.3 ml. of absolute methanol is treated with a solution of 0.05 ml. of concentrated sulfuric acid in 1.0 ml. of dioxane. Solution occurs in about 5–7 minutes and a deep red color developed over the course of an additional 20 minutes. The reaction is stopped by the addition of 1.1 ml. of pyridine which discharged the red color of the reaction mixture. The reaction mixture is poured into water to give an oily precipitate which crystallized and is filtered to give 2.1 g. of the crude product. The infrared spectrum demonstrated the absence of any $\Delta^4$-3-one. A portion (1.0 g.) of this solid is recrystallized from methanol to give prisms, melting point 189–191° C.;

$$\lambda_{max.}^{MeOH} 239 \ (\epsilon \ 20,900)$$

$[\alpha]_D^{25}$ −20.6° (1% pyridine in chloroform).

A solution of 21-acetoxy-3-ethoxy-9α-fluoro-11β-hydroxy-15α,17α-isopropylidenedioxy-3,5-pregnadien-20-one (1.0 g.) in 100 ml. of absolute ether is treated with 3.5 ml. of a 0.62 N monoperphthalic acid in ether solution. After standing at room temperature for 24 hours, there precipitates 0.267 g. of 21-acetoxy-9α-fluoro-6β,11β-dihydroxy - 16α,17α - isopropylidenedioxy-4-pregnene-3,20-dione, melting point 272° C. dec. Crystallization from ethyl acetate-heptane raises the melting point to 277–280° C.; $[\alpha]_D$ +88.6° (c, 1.120 in 1% pyridine in chloroform);

$$\lambda_{max.}^{MeOH} 232 \ m\mu \ (\epsilon \ 16,500)$$

When 5.0 ml. of a 0.62 N monoperphthalic acid solution in ether is added to a solution of 1.1 g. of 21-acetoxy-9α-fluoro - 11β - hydroxy-16α,17α-isopropylidenedioxy-3-methoxy-3,5-pregnadien-20-one in 25 ml. of absolute ether there precipitates on standing 0.280 g. of the 6β-hydroxy-$\Delta^4$-3-one as immediately above, melting point 272–276° C. One crystallization from ethyl acetate-heptane gives 0.145 g. of product, melting point 286–288° C. which is identical to the material prepared in the above experiment.

EXAMPLE 5

9α-Fluoro-6β,11β,21-Trihydroxy-16α,17α-Isopropylidenedioxy-4-Pregnene-3,20-Dione One hundred milligrams of 21-acetoxy-9α-fluoro-6β,11β-dihydroxy - 16α,17α-isopropylidenedioxy-4-pregnene-3,20-dione is suspended in 30 ml. of methanol and nitrogen is bubbled through this suspension. One milliliter of an aqueous 10% potassium carbonate solution is added and the suspension is agitated by the nitrogen steam for 45 minutes with complete solution occurring after 30 minutes. The reaction mixture is neutralized with acetic acid and poured into water.

The reaction mixture is extracted with ethyl acetate. This in turn is washed with saturated salt solution and dried. Evaporation gives a residue which is crystallized several times from ethyl acetate-heptane to yield prisms; melting point 238–241° C.; $[\alpha]_D^{25}$ +90° (pyridine);

$$\lambda_{max.}^{MeOH} 232 \ m\mu \ (\epsilon \ 13,600)$$

EXAMPLE 6

6β,21-Diacetoxy-9α-Fluoro-11β-Hydroxy-16α,17α-Isopropylidenedioxy-4-Pregnene-3,20-Dione Five hundred milligrams of 21-acetoxy-9α-fluoro-6β,11β - dihydroxy-16α,17α-isopropylidenedioxy-4-pregnene-3,20-dione, 5.0 ml. of acetic anhydride and 5.0 ml. of pyridine is heated on a steam bath for one hour. After cooling, the reaction mixture is poured into water and filtered to give 0.55 g. of a white solid. Attempted crystallizations from various solvents are unsuccessful. The material is taken to dryness and dissolved in ether. Petroleum ether is added and the entire material is precipitated and the solution taken to dryness to give 0.485 g. of a fluffy white solid which exhibits a broad melting point and appears to be solvated, $$\lambda_{max.}^{MeOH} 232 \ m\mu \ (\epsilon \ 14,500)$$

$[\alpha]_D^{25}$ +63.3° (chloroform).

EXAMPLE 7

9α-Fluoro-6β,11β,21-Trihydroxy-16α,17α-Isopropylidenedioxy-1,4-Pregnadiene-3,20-Dione (A) Nine hundred milligrams of 21-acetoxy-9α-fluoro-6β,11β-dihydroxy - 16α,17α - isopropylidenedioxy-4-pregnene-3,20-dione is dissolved in 10 ml. of dry pyridine and 5 ml. of acetic anhydride is added. After standing overnight at room temperature, the acetylation mixture is poured into water. The ethyl acetate extract of this solution is washed with a 2% aqueous hydrochloric acid solution and then repeatedly with a saturated saline solution. After drying over sodium sulfate, evaporation of the solvent gives 1.0 g. of a glass.

A solution of this material in 15 ml. of dioxane containing 0.64 g. of 2,3-dichloro-5,6-dicyanobenzoquinone is refluxed for 24 hours. On cooling, 0.35 g. of the hydroquinone precipitates. After filtration the solvents are removed and the residue taken up in ethyl acetate. The extract is washed with water, cold 2% sodium hydroxide and saturated saline solution in that order. The sodium sulfate dried solution is evaporated to give 0.875 g. of the crude diacetate. The infrared spectrum of this material demonstrated the presence of the $\Delta^{1,4}$-3-one system.

A solution of the diacetate in 15 ml. of methanol is agitated by a slow stream of nitrogen. A 10% aqueous potassium carbonate solution (6.0 ml.) is added and reaction allowed to proceed for 45 minutes. The reaction mixture is neutralized with glacial acetic acid and most of the methanol removed at reduced pressure. Ethyl acetate (400 ml.) is added to the solution and the organic layer is washed with a saturated sodium bicarbonate solution followed by saturated saline solution. After drying the residue obtained upon evaporation of the solvent is recrystallized from ethyl aceate-heptane and gives an initial precipitate which is impure. The mother liquor from the recrystallization, on standing overnight, precipitated 60 mg. of the desired product. After two crystallizations from ethyl acetate-heptane, there is obtained 32 mg. of prisms; melting point 277–282° C.; $[\alpha]_D^{25}$ +72° (pyridine);

$$\lambda_{max.}^{MeOH} 240 \ m\mu \ (\epsilon \ 16,000)$$

(B) Two drops of 70% perchloric acid are added to a suspension of 50 mg. of 9α-fluoro-6β,11β,16α,17α,21-pentahydroxy-1,4-pregnadiene-3,20-dione in 10 ml. of acetone. The reaction mixture is stirred for 3 hours by which time the solution is complete. A few milliliters of a saturated sodium bicarbonate solution is added and then most of the acetone is removed at reduced pressure. After pouring the reaction mixture into water, the suspension is filtered and dried. Crystallization of this material from acetone-petroleum ether gives 35 mg. of the desired acetonide; melting point 268–269° C. This is identical in all respects to the material isolated previously.

EXAMPLE 8

16α,21-Diacetoxy-6β,11β,17-Trihydroxy-4-Pregnene-3,20-Dione (A) An ethereal solution (35 ml.) of the crude methyl enol ether prepared from 1.0 g. of 16α,21-diacetoxy-11β,17α-dihydroxy-4-pregnene-3,20-dione is treated with 10 ml. of an ethereal solution of monoperphthalic acid (0.064 g./ml.). After short standing, there begins to precipitate the desired product which finally totaled 0.64 g. of the 6β-hydroxy compound. The compound when recrystallized from ethyl acetate-heptane gives a solvated melting point of 155–160° C.

(B) A solution of one hundred milligrams of 16α,21-diacetoxy-6β,11β,17α-trihydroxy-4-pregnene-3,20-dione is added to 25 ml. of a saturated solution of ammonia in absolute methanol and is kept at 0–5° C. for 2 hours.

Evaporation of the solution gives the desired pentol, 6β,11β,16α,17α,21 - pentahydroxy - 4 - pregnene - 3,20 - dione.

EXAMPLE 9

*21-Acetoxy-6β-Hydroxy-4-Pregnene-3,20-Dione*

A solution of 1.85 g. of the methyl enol ether of desoxycorticosterone is dissolved in 150 ml. of ether and is reacted with 20 ml. of an ethereal solution of monoperphthalic acid (0.064 g./ml.). After standing at room temperature for 20 hours, the solution is washed with a saturated sodium bicarbonate solution and then a saturated saline solution. After drying, the residue upon evaporation is chromatographed on synthetic magnesium silicate absorbent. The material eluted with the methylene chloride+6% acetone aliquots (4×50 ml.) and the methylene chloride+8% acetone aliquots (4×50 ml.) is recrystallized to give 0.355 g. of the desired product, melting point 190–192° C.

EXAMPLE 10

*21-Acetoxy-6β,17α-Dihydroxy-4-Pregnene-3,11,20-Trione*

A solution of 2.0 g. of the methyl enol ether of cortisone 21-acetate is dissolved in 200 ml. of ether (USP) and 40 ml. of 0.16 N monoperphthalic acid is added. After standing at room temperature for 17 hours, no precipitate is noted. The solution is washed well with a saturated saline solution. After drying, the residue on evaporation is crystallized from acetone-petroleum ether to give 0.215 g. of 21 - acetoxy - 6β,17α - dihydroxy - 4 - pregnene-3,11,20-trione; melting point 264–267° C.

EXAMPLE 11

*21-Acetoxy-6β,17α-Dihydroxy-4-Pregnene-3,20-Dione*

A solution of 5.65 g. of the methyl enol ether of substance "S" acetate in 600 ml. of absolute ether is reacted with 100 ml. of monoperphthalic acid (0.055 g./ml.) in ether. After standing for 24 hours, there precipitated 830 mg. of 21-acetoxy-6β,17α-dihydroxy - 4 - pregnene-3,20-dione which, after several recrystallizations has a melting point of 268–270° C. An additional amount of material could be recovered by processing the mother liquor.

EXAMPLE 12

*16α,21-Diacetoxy-9α-Fluoro-11β,17α-Dihydroxy-4,6-Pregnadiene-3,20-Dione*

16α,21 - diacetoxy-9α-fluoro - 11β,17α - dihydroxy-3-methoxy-3,5-pregnadien-20-one (0.40 g.) is dissolved in a cooled solution (0–5° C.) of 15 ml. of acetone containing 0.25 g. of sodium acetate trihydrate. To this solution is added 0.25 g. of N-bromoacetamide in 2 ml. of water and this immediately followed by 0.25 ml. of glacial acetic acid. Stirring is continued for 3 hours and then the reaction mixture poured into water, filtered and dried. The crude 6-bromo compound (melting point 135–145° C. dec.) exhibited absorption in the infrared indicative of the Δ⁴-3-one system.

A solution of the crude bromo compound is dissolved in collidine (5 ml.) and refluxed for 45 minutes in a carbon dioxide atmosphere. After cooling the collidine hydrobromide is collected and the filtrate evaporated to a viscous brown oil. This is taken up in methylene chloride and chromatographed on activated magnesium silicate. Combination of the aliquots (5×20 ml.) of the methylene chloride+5% acetone and 6% acetone fractions gives 0.095 g. of compound melting point 239–241° C. Recrystallization of this material from acetone-petroleum ether raises the melting point to 241–242° C.; $[\alpha]_D^{25}$ +56° (chloroform);

$$\lambda_{max.}^{MeOH} \ 281 \ m\mu \ (\epsilon \ 19,800)$$

We claim:
1. A method of preparing compounds of the formula:

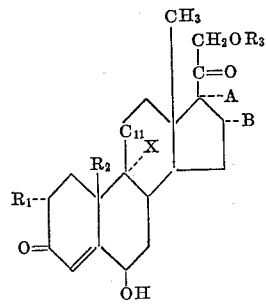

wherein $R_1$ is selected from the group consisting of hydrogen and lower alkyl radicals, $R_2$ is selected from the group consisting of hydrogen and methyl radicals, $R_3$ is selected from the group consisting of hydrogen and lower alkanoyl radicals, A is selected from the group consisting of hydrogen and hydroxyl radicals, B is selected from the group consisting of hydrogen, hydroxyl and lower alkanoyloxy radicals and when A is hydroxyl B is selected from the group consisting of hydrogen and lower alkanoyloxy radicals and A and B when taken together form a lower alkylidenedioxy radical, $C_{11}$ is selected from the group consisting of

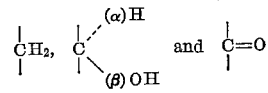

radicals and X is selected from the group consisting of hydrogen and fluorine radicals which comprises reacting a steroid enol ether of the formula:

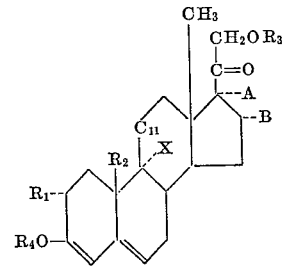

wherein $R_1$, $R_2$, $R_3$, A, B, $C_{11}$ and X are as defined above and $R_4$ is a lower alkyl radical, with a peracid selected from the group consisting of monoperphthalic, perbenzoic and performic acids.

2. A method of preparing 16α,21-diacetoxy-9α-fluoro-6β,11β,17α-trihydroxy-4-pregnene-3,20-dione which comprises reacting 16α,21-diacetoxy-9α-fluoro-11β,17α-dihydroxy-3-methoxy-3,5-pregnadien-20-one with monoperphthalic acid in a solvent inert to the reactants and recovering said compounds therefrom.

3. A method of preparing 21-acetoxy-9α-fluoro-6β,11β-dihydroxy - 16α,17α - isopropylidenedioxy - 4 - pregnene-3,20 - dione which comprises reacting 21 - acetoxy - 3-methoxy - 9α - fluoro - 11β - hydroxy - 16α,17α - isopropylidenedioxy-3,5-pregnadien-20-one with monoperphthalic acid in a solvent inert to the reactants and recovering said compound therefrom.

4. A method of preparing 16α,21-diacetoxy-6β,11β,17α-trihydroxy-4-pregnene-3,20-dione which comprises reacting 16α,21-diacetoxy-11β,17α-dihydroxy-3-methoxy-3,5-pregnadien-20-one with monoperphthalic acid in a solvent inert to the reactants and recovering said compound therefrom.

5. A method of preparing 21-acetoxy-6β-hydroxy-4-pregnene-3,20-dione which comprises reacting 21-acetoxy-3-methoxy-3,5-pregnadien-20-one with monoperphthalic acid in a solvent inert to the reactants and recovering said compound therefrom.

6. A method of preparing 21-acetoxy-6β,17α-dihydroxy-4-pregnene-3,11,20-trione which comprises reacting 21 - acetoxy - 17α - hydroxy - 3 - methoxy - 3,5 - pregnadien-11,20-dione with monoperphthalic acid in a solvent inert to the reactants and recovering said compound therefrom.

7. A method of preparing 21-acetoxy-6β,17α-dihydroxy-4-pregnene-3,20-dione which comprises reacting 21-acetoxy - 17α - hydroxy-3-methoxy-3,5-pregnadien-20-one with monoperphthalic acid in a solvent inert to the reactants and recovering said compound therefrom.

8. The compound 9α-fluoro-6β,11β,16α,17α,21-pentahydroxy-1,4-pregnadiene-3,20-dione.

9. The compound 6β,16α,21 - triacetoxy - 9α - fluoro-11β,17α-dihydroxy-1,4-pregnadiene-3,20-dione.

References Cited in the file of this patent

UNITED STATES PATENTS 2,937,975    Figdor et al. _____ May 24, 1960

OTHER REFERENCES

Smith et al.: J. Org. Chem., vol. 26, pages 974–975 (March 1961).